(12) United States Patent
Krueger et al.

(10) Patent No.: US 9,902,203 B2
(45) Date of Patent: Feb. 27, 2018

(54) PNEUMATIC VEHICLE TIRE, PREFERABLY PNEUMATIC COMMERCIAL VEHICLE TIRE

(71) Applicant: Continental Reifen Deutschland GmbH, Hannover (DE)

(72) Inventors: Joern Krueger, Mandelbachtal (DE); Carole Justine, Scharrel (DE); Thomas Kramer, Herford (DE); Volkmar Fries, Bad Eilsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 288 days.

(21) Appl. No.: 14/636,489

(22) Filed: Mar. 3, 2015

(65) Prior Publication Data
US 2015/0174960 A1    Jun. 25, 2015

Related U.S. Application Data

(63) Continuation of application No. PCT/EP2013/065858, filed on Jul. 29, 2013.

(30) Foreign Application Priority Data

Sep. 4, 2012   (DE) .................. 10 2012 108 173

(51) Int. Cl.
*B60C 9/20* (2006.01)
*B60C 9/00* (2006.01)
(Continued)

(52) U.S. Cl.
CPC .............. *B60C 9/0007* (2013.01); *B60C 5/12* (2013.01); *B60C 9/18* (2013.01); *B60C 9/2006* (2013.01);
(Continued)

(58) Field of Classification Search
CPC ................ B60C 9/2003; B60C 9/2006; B60C 2009/0014
See application file for complete search history.

(56) References Cited

U.S. PATENT DOCUMENTS 2,605,201 A * 7/1952 Howe ................... B60C 9/0007
                                                152/556
4,421,899 A * 12/1983 Yamazaki .............. C08G 75/14
                                                152/537
(Continued)

FOREIGN PATENT DOCUMENTS

JP        60-226303 A    11/1985

OTHER PUBLICATIONS

International Search Report dated Nov. 5, 2013 of international application PCT/EP2013/065858 on which this application is based.

*Primary Examiner* — Robert C Dye
(74) *Attorney, Agent, or Firm* — Walter Ottesen, P.A.

(57) ABSTRACT

A pneumatic commercial vehicle tire of radial design includes at least a three-ply belt, of which two belt plies are working plies and one radially outermost belt ply is a cover ply. Each of these belt plies includes reinforcements which are made of steel cord and which are embedded in elastomer. The steel cords of each of the three belt plies are coated with brass so as to provide for good elastomer adhesion. The brass coating of the reinforcement supports of the two working plies has a copper proportion of 60 wt. % to 65 wt. % and the brass coating of the reinforcement supports of the cover ply has a copper proportion of 66 wt. % to 70 wt. %.

9 Claims, 1 Drawing Sheet

(51) Int. Cl.
*D07B 1/06* (2006.01)
*B60C 5/12* (2006.01)
*B60C 9/18* (2006.01)
*D02G 3/36* (2006.01)
*D02G 3/48* (2006.01)

(52) U.S. Cl.
CPC .............. *D02G 3/36* (2013.01); *D02G 3/48* (2013.01); *D07B 1/0666* (2013.01); *B60C 2009/0014* (2013.01); *B60C 2009/2074* (2013.01); *D07B 2205/3089* (2013.01)

(56) References Cited

U.S. PATENT DOCUMENTS

| | | |
|---|---|---|
| 4,732,197 A | 3/1988 | Heishi et al. |
| 4,733,708 A | 3/1988 | Kindry et al. |
| 2003/0178117 A1* | 9/2003 | Oosawa ............... B60C 9/0007 152/565 |
| 2006/0123862 A1 | 6/2006 | Pavan et al. |
| 2006/0179813 A1* | 8/2006 | Vanneste ............... D02G 3/48 57/211 |
| 2009/0277559 A1 | 11/2009 | Kuriya |
| 2010/0200143 A1 | 8/2010 | Okamoto et al. |
| 2011/0290398 A1 | 12/2011 | Yasuda |

\* cited by examiner

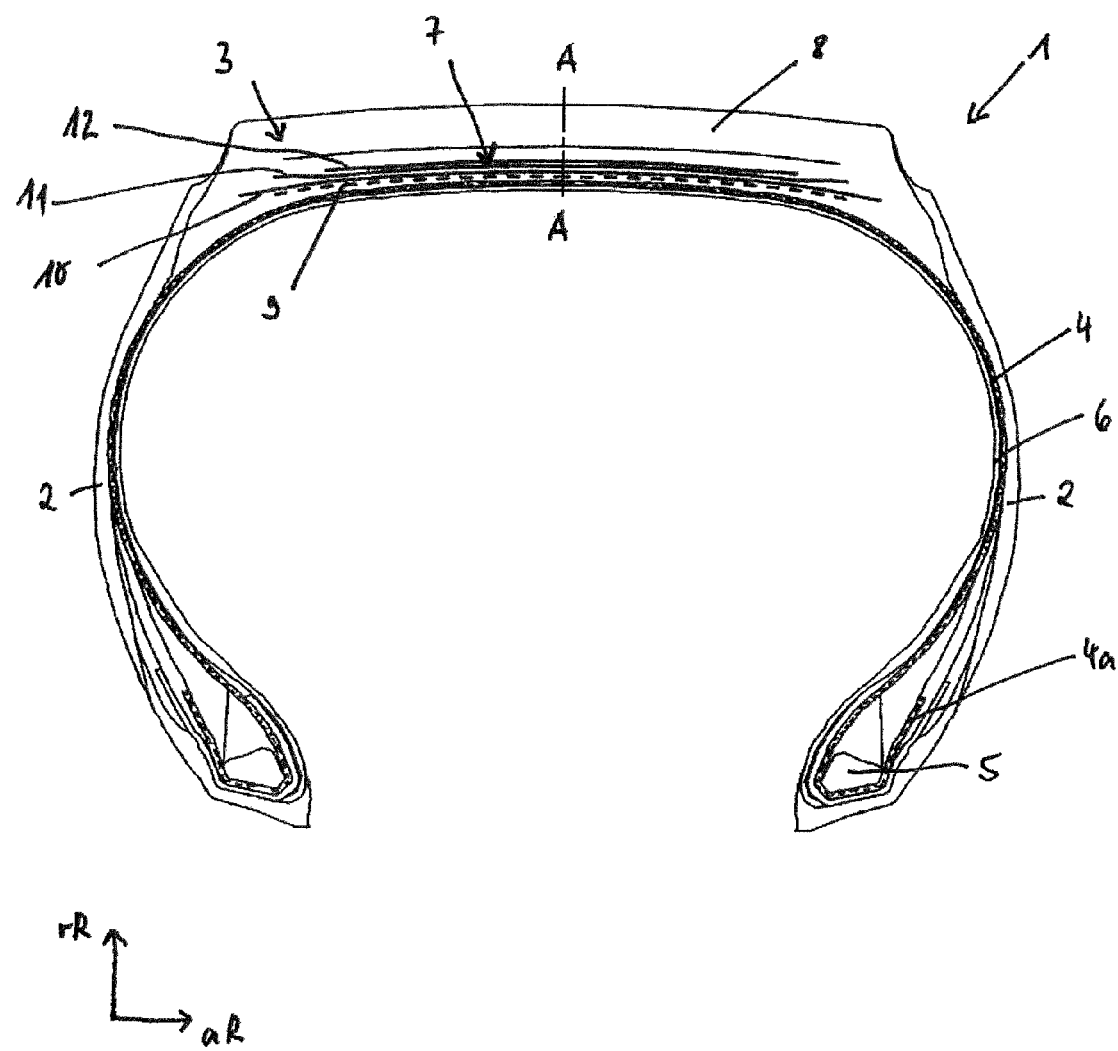

PNEUMATIC VEHICLE TIRE, PREFERABLY PNEUMATIC COMMERCIAL VEHICLE TIRE

CROSS REFERENCE TO RELATED APPLICATIONS

This application is a continuation application of international patent application PCT/EP2013/065858, filed Jul. 29, 2013, designating the United States and claiming priority from German application 10 2012 108 173.5, filed Sep. 4, 2012, and the entire content of both applications is incorporated herein by reference.

FIELD OF THE INVENTION

The disclosure relates to a pneumatic vehicle tire, preferably a pneumatic commercial vehicle tire of radial design, having a belt that has at least three belt plies, of which two belt plies are configured as working plies and of which the radially outermost belt ply is configured as a cover ply, wherein each of the belt plies includes reinforcements made of steel cord embedded in elastomer and wherein the steel cords of each of the three belt plies are coated with brass for good elastomer adhesion.

BACKGROUND OF THE INVENTION

Commercial vehicle tires having a belt that has two working plies and a cover ply are known to those skilled in the art. Normally, the belt of commercial vehicle tires has four plies, which include steel cords embedded in rubber compounds. In the case of a 4-ply belt, the radially innermost ply is referred to as the first belt ply or, according to its function, as a blocking ply. The second belt ply and the third belt ply are arranged radially on the outside of the first belt ply, acting as working plies. The radially outermost working ply is covered by the fourth belt ply, the cover ply.

In general, the steel cords of the first belt ply are at an angle of >45° to the circumferential direction. The first belt ply is referred to as a blocking ply because of its function of blocking the movement of the working plies in the circumferential direction. The steel cords of the two working plies are at an identical angle of between 15° and 30° to the circumferential direction of the tire, wherein the steel cords of one working ply slope in the opposite direction to the steel cords of the other working ply, relative to the circumferential direction of the tire. Thus, the steel cords of one working ply are arranged crosswise with respect to the steel cords of the other working ply. The working plies are subject to high shear forces and tensile forces and carry the principal load in the belt, and are therefore of particular importance for belt durability. The fourth belt ply has steel cords which enclose an angle of between 15° and 30° with the circumferential direction. The fourth belt ply, the cover ply, has the function of a protective ply for the two working plies situated thereunder since the cover ply forms a barrier to stones which can penetrate through the tread assembly. Without the cover ply, the cords of the working plies would be damaged by penetrating stones and would be subject to increased corrosion, something that would ultimately reduce the load capacity, durability and retread capacity of the tire.

The practice of providing steel cords of belt plies with a brass coating for better rubber adhesion is sufficiently well known. The steel cords of all the plies of multi-ply belts are always coated with the same brass composition. JP 60226303 A, for example, has disclosed the practice of providing the steel cords of all the belt plies of a radial tire with a brass coating which has a copper content of 60% by weight to 64% by weight. U.S. Pat. No. 4,732,197, for example, has disclosed the practice of providing the steel cords of all the belt plies of a radial tire with a brass coating which has a copper content of 60% by weight to 70% by weight.

It is furthermore known that a high copper content of the brass coating, while having a reduced adhesion, leads to improved corrosion resistance and that a low copper content of the brass coating, while having reduced corrosion resistance, leads to improved adhesion.

SUMMARY OF THE INVENTION

It is the object of the invention to provide a pneumatic vehicle tire, preferably a pneumatic commercial vehicle tire having a belt assembly comprising two working plies and a cover ply, the durability of which is improved in terms of the corrosion resistance and adhesion of the abovementioned belt plies.

The object is achieved in that the brass coating of the reinforcements of the two working plies has a copper content of 60% by weight to 65% by weight and in that the brass coating of the reinforcements of the cover ply has a copper content of 66% by weight to 70% by weight.

In this way, a pneumatic vehicle tire according to the invention is provided, the different belt plies of which have steel cords which have a brass coating that is adapted in an optimized way to match the principal requirements of these different belt plies.

By virtue of a copper content of the brass coating of the steel cords of 66% by weight to 70% by weight, the cover ply, which forms a barrier to stones for the two working plies situated thereunder, acting as a protective ply, has improved corrosion resistance with slightly reduced adhesion. In contrast, the working plies, which bear the principal load, have improved adhesion with slightly reduced corrosion resistance by virtue of a copper content of 60% by weight to 65% by weight of the brass coating of the steel cords.

It is advantageous if the brass coating has a thickness of 0.05 μm to 0.4 μm.

In a preferred embodiment, the brass coating of the reinforcements of the two working plies has a thickness of 0.15 μm to 0.35 μm and/or the brass coating of the reinforcements of the cover ply has a thickness of 0.05 μm to 0.2 μm. The following relationship has been found: the thinner the brass coating, the better the corrosion resistance.

It is expedient if the cover ply has at least one steel cord, of which at least one inner filament has a zinc coating, wherein the steel cord is preferably a cord of construction 1+N. The corrosion resistance is further increased if, instead of being coated with brass, an inner filament is coated with zinc and serves as a sacrificial anode. The adhesion of this reinforcement is not significantly reduced since the outer, brass-coated filaments of the steel cord are decisively responsible for adhesion to the rubber.

It is advantageous if the brass coating of the reinforcements of the two working plies has a copper content of about 63% by weight. The brass coating has proven particularly advantageous for improved adhesion with slightly reduced corrosion resistance.

It is advantageous if the brass coating of the reinforcements of the cover ply has a copper content of about 68% by weight. The brass coating has proven particularly advantageous for improved corrosion resistance with slightly reduced adhesion.

The following table shows two exemplary embodiments of belts (belt 1, belt 2), which can be used in a tire. The illustrative belts 1 and 2 have a cover ply and two working plies. The belts 1 and 2 have brass-coated cord structures composed of HT (High Tensile) steel in the working and cover plies. The brass coating of the particular cord construction is given in g/kg, and the coating thickness is given in μm. It is apparent that the steel cords of the cover ply of a belt preferably have a thinner coating thickness than the steel cords of the working plies.

TABLE

| Belt | Belt ply | Steel cord construction | Coating [g/kg] | Coating thickness [μm] |
|---|---|---|---|---|
| Belt 1 | Working plies | 3 × 0.20 + 6 × 0.35HT | 2.8-4.5 | 0.21-0.35 |
|  | Cover ply | 3 × 0.20 + 6 × 0.35HT | 1.2-2.8 | 0.08-0.21 |
| Belt 2 | Working plies | 1 + 5 × 0.40HT | 2.5-4 | 0.15-0.25 |
|  | Cover ply | 1 + 5 × 0.40HT | 1.0-2.5 | 0.05-0.15 |

BRIEF DESCRIPTION OF THE DRAWING

The invention will now be described with reference to the single FIGURE of the drawing (FIG. 1) which shows a schematic illustrative embodiment.

DESCRIPTION OF THE PREFERRED EMBODIMENTS OF THE INVENTION

FIG. 1 shows a cross section through a pneumatic commercial vehicle tire 1 according to the invention of radial design. The pneumatic commercial vehicle tire has a conventional standard construction, having two side walls 2, a crown region 3, a carcass 4 with steel cords, which extends around the bead cores 5 from the inside axially to the outside axially and ends in a carcass turnup 4a, having an inner liner 6 of airtight design, a multi-ply belt 7 and a tread 8.

The belt 7 has four belt plies 9, 10, 11 and 12, wherein the fourth, radially outermost belt ply 12 is the thinnest of all the plies and forms the cover ply. The first belt ply 9 is the blocking ply, the second belt ply 10 and the third belt ply 11 are the working plies. The widest belt ply is the second belt ply 10, which consequently completely overlaps the first belt ply 9. The third belt ply 11 is somewhat wider than or the same width as the first belt ply 9. All the belt plies (9, 10, 11, 12) include reinforcements of steel cord embedded in a rubber compound, the belt rubber. The reinforcements of the working plies (10, 11) and of the cover ply 12 have the construction 3×0.2 mm+6×0.35 mm and are made of HT steel cord, for example. Of course, it is also possible for steel cords of some other construction to be used in the belt plies.

The steel cords in each of plies 9, 10, 11 and 12 each extend parallel to one another and enclose certain angles with the circumferential direction of the tire indicated by the line A-A. The slope of the steel cords relative to the circumferential direction in the individual belt plies 9, 10, 11 and 12, beginning with the radially innermost belt ply 9, is such that the sequence is RRLR or RRLL (clockwise slope, clockwise slope, counterclockwise slope, clockwise slope or counterclockwise slope). The steel cords of the first belt ply 9 enclose an angle of 65° to 45° with the circumferential direction A-A. The steel cords of the second, third and fourth belt plies 10, 11 and 12 enclose an angle of 30° to 10° with the circumferential direction A-A.

The steel cords of each of the belt plies 9, 10, 11 and 12 are coated with brass for good elastomer adhesion. The brass coating of the steel cords of the two working plies (10, 11) has a copper content of 60% by weight to 65% by weight, preferably of 63% by weight. The coating thickness of the brass is from 0.15 μm to 0.35 μm. The brass coating of the steel cords of the cover ply 12 has a copper content of 66% by weight to 70% by weight, preferably 68% by weight. The coating thickness of the brass is from 0.05 μm to 0.2 μm.

It is understood that the foregoing description is that of the preferred embodiments of the invention and that various changes and modifications may be made thereto without departing from the spirit and scope of the invention as defined in the appended claims.

LIST OF REFERENCE SIGNS (Part of the Description)
1 pneumatic commercial vehicle tire
2 side wall
3 crown region
4 carcass
4a carcass turnup
5 bead core
6 inner liner
7 belt
8 tread
9 blocking ply
10 working ply
11 working ply
12 cover ply
rR radial direction
aR axial direction

What is claimed is:

1. A pneumatic vehicle tire of radial design, having a belt that includes at least three belt plies, of which two belt plies are configured as working plies and of which the radially outermost belt ply is configured as a cover ply, the pneumatic vehicle tire comprising:
reinforcements made of steel cord embedded in elastomer being provided in each of the at least three belt plies; and,
the reinforcements of each of the three belt plies having a brass coating for providing elastomer adhesion,
wherein the brass coating of the reinforcements of the two working plies has a copper content of 60% by weight to 63% by weight and wherein the brass coating has a thickness of between 0.15 μm to 0.35 μm, and
wherein the brass coating of the reinforcements of the cover ply has a copper content of 68% by weight to 70% by weight and wherein the brass coating has a thickness of between 0.05 μm and 0.21 μm.

2. The pneumatic vehicle tire as claimed in claim 1, wherein the thickness of the brass coating of the reinforcements of the two working plies is greater than the thickness of the brass coating of the reinforcements of the cover ply.

3. The pneumatic vehicle tire as claimed in claim 1, wherein the brass coating of the reinforcements of the two working plies has a thickness of 0.15 μm to 0.21 μm or 0.25 μm to 0.35 μm.

4. The pneumatic vehicle tire as claimed in claim 1, wherein the brass coating of the reinforcements of the cover ply has a thickness of 0.05 μm to 0.08 μm or 0.15 μm to 0.2 μm.

5. The pneumatic vehicle tire as claimed in claim 1, wherein at least one of the steel cords of the cover ply comprises at least one inner filament that has a zinc coating.

6. The pneumatic vehicle tire as claimed in claim 1, wherein the brass coating of the reinforcements of the two working plies has a copper content of 63% by weight.

7. The pneumatic vehicle tire as claimed in claim 1, wherein the brass coating of the reinforcements of the cover ply has a copper content of 68% by weight.

8. The pneumatic vehicle tire as claimed in claim 1, wherein the tire is a pneumatic commercial vehicle tire.

9. The pneumatic vehicle tire as claimed in claim 1, wherein the at least one steel cord of the cover ply comprising at least one inner filament that has a zinc coating is a cord of construction 1+N.

\* \* \* \* \*